(12) United States Patent
Yang et al.

(10) Patent No.: US 11,581,695 B2
(45) Date of Patent: Feb. 14, 2023

(54) HIGH-FREQUENCY-REPRODUCIBILITY LASER FREQUENCY STABILIZATION METHOD AND DEVICE BASED ON MULTI-POINT ACQUISITION OF LASER TUBE TEMPERATURE

(71) Applicant: Harbin Institute of Technology, Harbin (CN)

(72) Inventors: Hongxing Yang, Harbin (CN); Yun Zou, Harbin (CN); Ziqi Yin, Harbin (CN); Jing Li, Harbin (CN); Pengcheng Hu, Harbin (CN); Jiubin Tan, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 280 days.

(21) Appl. No.: 17/022,343

(22) Filed: Sep. 16, 2020

(65) Prior Publication Data
US 2021/0203121 A1   Jul. 1, 2021

(30) Foreign Application Priority Data
Dec. 31, 2019 (CN) .......................... 201911410452.6

(51) Int. Cl.
*H01S 3/131* (2006.01)
*G01K 1/02* (2021.01)
(Continued)

(52) U.S. Cl.
CPC ............ *H01S 3/1317* (2013.01); *G01K 1/026* (2013.01); *H01S 3/1305* (2013.01); *H05B 1/023* (2013.01);
(Continued)

(58) Field of Classification Search
CPC ........ H01S 3/1305; H01S 3/041; H01S 3/134; H01S 3/1317; H01S 3/097; H01S 3/0405;
(Continued)

(56) References Cited

U.S. PATENT DOCUMENTS 11,414,196 B2 *   8/2022   Burton ................. H05B 1/0236
11,415,324 B2 *   8/2022   Song ....................... F24C 7/083
(Continued)

*Primary Examiner* — Eric S Stapleton
(74) *Attorney, Agent, or Firm* — IPro, PLLC

(57) ABSTRACT

The disclosure provides a high-frequency-reproducibility laser frequency stabilization method and device based on multi-point acquisition of laser tube temperature. The laser frequency stabilization device includes: a frequency stabilization control circuit. The frequency stabilization control circuit includes a polarizing beam splitter, an optical power conversion circuit, an A/D conversion circuit, a temperature measuring circuit, a microprocessor, a D/A converter and a heating film driver. The polarizing beam splitter is disposed outside any one of laser transmitting holes. The optical power conversion circuit is disposed on reflection and refraction optical paths of the polarizing beam splitter. The optical power conversion circuit, the A/D conversion circuit, the microprocessor, the D/A converter, the heating film driver and a plurality of groups of heating films are sequentially in one-way connection. Temperature sensors, the temperature measuring circuit and the microprocessor are sequentially in one-way connection.

5 Claims, 7 Drawing Sheets

(51) Int. Cl.
*H01S 3/13* (2006.01)
*H05B 1/02* (2006.01)
*G02B 27/28* (2006.01)

(52) U.S. Cl.
CPC ...... *G02B 27/283* (2013.01); *H05B 2203/005* (2013.01); *H05B 2203/013* (2013.01)

(58) Field of Classification Search
CPC .... H01S 3/0305; G01K 1/026; G01K 17/003; H05B 1/023; H05B 2203/013; H05B 2203/005; G02B 27/283
USPC ........................................................ 219/210
See application file for complete search history.

(56) References Cited

U.S. PATENT DOCUMENTS

| | | | | |
|---|---|---|---|---|
| 11,415,468 | B2* | 8/2022 | Murata | G01K 1/024 |
| 11,415,510 | B2* | 8/2022 | Ohno | G02B 27/30 |
| 11,415,794 | B2* | 8/2022 | Gao | G02B 26/123 |
| 11,415,799 | B2* | 8/2022 | Hong | G02B 27/283 |
| 11,415,811 | B2* | 8/2022 | Zheng | G02B 27/0172 |
| 11,415,812 | B2* | 8/2022 | Mansharof | G02B 27/288 |
| 11,418,000 | B2* | 8/2022 | Mirkov | H01S 3/115 |
| 11,418,012 | B2* | 8/2022 | Gong | G01B 11/2441 |
| 11,418,263 | B2* | 8/2022 | Zhang | G02F 1/218 |
| 11,419,186 | B2* | 8/2022 | Huang | H05B 3/12 |
| 2020/0399494 | A1* | 12/2020 | Linder | C09D 11/52 |
| 2020/0400506 | A1* | 12/2020 | Chasteen | G01K 3/10 |
| 2020/0400958 | A1* | 12/2020 | Border | H04N 13/344 |
| 2020/0400966 | A1* | 12/2020 | Muendel | B23K 26/073 |
| 2022/0244535 | A1* | 8/2022 | Kirillov | G02B 27/0172 |
| 2022/0251454 | A1* | 8/2022 | Giannelia | B65D 90/34 |
| 2022/0252391 | A1* | 8/2022 | Hao | G02B 5/3025 |
| 2022/0252459 | A1* | 8/2022 | Park | G01N 21/21 |
| 2022/0252546 | A1* | 8/2022 | Woods | G01K 1/026 |
| 2022/0252885 | A1* | 8/2022 | Wang | G02F 1/13731 |
| 2022/0253079 | A1* | 8/2022 | Lee | G05D 23/1919 |
| 2022/0254611 | A1* | 8/2022 | Li | H01J 37/32522 |
| 2022/0255632 | A1* | 8/2022 | Schibli | H01S 3/1305 |
| 2022/0256656 | A1* | 8/2022 | Fukuda | B60S 1/02 |

* cited by examiner

A-A
Sectional view

HIGH-FREQUENCY-REPRODUCIBILITY LASER FREQUENCY STABILIZATION METHOD AND DEVICE BASED ON MULTI-POINT ACQUISITION OF LASER TUBE TEMPERATURE

TECHNICAL FIELD

The disclosure relates to a high-frequency-reproducibility laser frequency stabilization method and device based on multi-point acquisition of laser tube temperature, and belongs to the technical field of laser application.

BACKGROUND

In high-end manufacturing industries of large-scale integrated circuits, precision machine tools, aerospace equipment and the like, the positioning precision of a related workpiece bench is required to reach the nano-scale. Technologies capable of reaching the nano-scale accuracy at present include a laser interferometry technology, an electrical sensing measurement technology and the like. Compared with other nano-scale measuring technologies, the laser interferometry technology has the characteristics of high accuracy, non-contact, wide measurement range and the like, and has become a main measuring technological means in the field of ultra-precise measurement. A laser interferometry system mainly consists of a laser device, a relevant interference optical path, a signal processing board card and the like. The laser device is used as a core of the whole interferometry system, and the frequency stabilization characteristic of laser output by the laser device determines the upper limit of measuring accuracy of the whole laser interference system. The frequency stabilization characteristic includes evaluation indexes in two aspects of frequency stability and frequency reproducibility. Technical methods of improving the frequency stability of the laser device at home and abroad are relatively mature. The frequency stability of industrial grade laser devices has achieved $10^{-8}$ or higher, however, there are few measures of improving the frequency reproducibility. The frequency reproducibility is also an important index that constrains the laser device. Even for the same laser device, the output frequency will change during twice switching-on. This will cause problems of reference wavelength inconsistency, measuring accuracy decrease and the like on the whole laser interferometry system. Therefore, improving the frequency reproducibility is an urgent problem to be solved in the technical field of laser application.

According to different executing methods of adjusting cavity lengths, laser frequency stabilization methods can be divided into a water cooling frequency stabilization method, an air cooling frequency stabilization method, a piezoelectric ceramic actuating frequency stabilization method and a thermal frequency stabilization method actuated by an electric heating device and the like. The thermal frequency stabilization method is a main frequency stabilization method of a double-frequency laser device. This method uses an electric heating device as an actuator to heat a laser tube, and uses a zero point of the double-longitudinal-mode optical power difference as a frequency stabilization control point. Through corresponding control algorithms, the power of the electric heating device is adjusted, so that the cavity length of a resonant cavity changes, and the laser device finally enters a stable-frequency state. In the whole process of frequency stabilization, there are three main links that influence the frequency reproducibility of the laser device.

On one hand, the problem is brought by a temperature measuring link. For process reasons of the laser tube, particularly for a problem of nonuniform thickness of a glass shell of a homemade laser tube, the temperature conduction of the whole laser tube is anisotropic, and if integral undifferentiated heating is adopted, a temperature field inside the laser tube is non-uniform. Under the effects of heat expansion and cold shrinkage, different surface heat expansion displacement of the laser tube may be caused, and axial and radial bending of the laser tube is further caused, so that an output frequency and power are caused to shift, and it cannot be compensated by controlling the power of the electric heating device.

On the other hand, an existing thermal frequency stabilization laser device uses single-point temperature measurement to represent the integral actual temperature of the laser tube, and the temperature distribution of the whole laser tube cannot be shown. For example, there is a patent of double-longitudinal-mode laser device interlocking method and device based on thermal frequency stabilization and acousto-optic frequency shift (Chinese patent CN201410308324.1). This method cannot correctly judge the changes of temperature and cavity length of the laser tube in a frequency stabilization control process, and a frequency stabilization control error is caused. Particularly, when the laser power-on and power-off time interval in two times is short, heat inside the laser tube cannot be sufficiently radiated out, the temperature gradient is obvious, and a greater measuring error will be introduced by single-point temperature measurement. It can be known according to actual experimental measurement that for a laser tube made of ordinary glass, when the stable-frequency temperature changes by $0.1°$ C. every time, the frequency changes by 0.2 to 0.6 MHz, and the relative frequency shift is about $10^{-9}$. This will seriously influence frequency stabilization accuracy and frequency reproducibility.

By aiming at the two above problems, some research scholars have performed a lot of corresponding researches. In order to reduce the influence of the temperature measuring mode on the frequency reproducibility of the laser device, Agilent's HP5517 inserts a heating wire into the laser tube. On one hand, the heating wire is utilized to heat the laser tube and control the cavity length. On the other hand, according to a resistance temperature coefficient of the heating wire per se, when the temperature of the laser tube changes, the resistance change of the heating wire causes voltage at two ends of the heating wire to change. A temperature measuring circuit expresses the temperature inside the laser tube through this voltage change. The heating wire is embedded inside the laser tube, so that the mode realizes high heating efficiency and the temperature measuring mode is simple. However, due to limitation of domestic processing processes, this kind of laser tube with the embedded heating wire is difficult to realize batch production.

Harbin Institute of Technology in China proposed a double-longitudinal-mode laser device frequency stabilization method based on a thermoelectric cooler (Chinese patent CN100382398: Double-Longitudinal-Mode Laser Device Frequency Stabilization Method and Device Based on Thermoelectric Cooler). The method preheats a laser tube by using a characteristic that heating is generated when reverse current is applied onto a TEC. Then, the temperature of the laser tube is controlled by controlling the magnitude and direction of the TEC current, so that an optical power difference of two longitudinal modes of a double-frequency laser device is zero, and a stable-frequency state is finally entered. The method can reduce a preheating time of the laser device, is slightly influenced by the temperature of an external environment, and can effectively improve the problem of frequency reproducibility of the laser device caused by environment influence. But a thermal structure in such a mode has defects. Due to material limitation, the thermoelectric cooler does not have flexibility and cannot cover the surface of the whole laser tube, the heat transfer between the thermoelectric cooler and the laser tube is instable, the inside of the laser tube is not uniformly heated, and the frequency stability of the laser device is influenced.

Besides the problem of frequency reproducibility of the laser device brought by heat transfer and the temperature measuring mode, a frequency stabilization control algorithm also influences the frequency stabilization effect of the laser device. The laser device in common use mainly adopts an optical power balance method. A stable-frequency discrimination condition of the method is to judge whether the optical power difference of the two longitudinal modes is zero or not. In general cases, when the optical power difference of the two longitudinal modes is controlled to be zero, it is regarded that the laser device enters a stable-frequency state. However, in a practical frequency stabilization process, due to reasons such as optical path asymmetry, noise interference and aging of the laser tube, a condition that the optical power of the two longitudinal modes increases or decreases at the same time may occur, at this moment, the optical power difference is still zero, but the total power and the cavity length of the laser device have changed, and the frequency has drifted. Therefore, the optical power balance method as an indirect feedback quantity cannot completely avoid the occurrence of this condition, and the further improvement of the frequency stability and the frequency reproducibility is limited.

Based on the above, there are two reasons why the frequency reproducibility of the laser device is low. Firstly, temperature points are different during frequency stabilization, so that final frequency stabilization work point drift is caused. A heating wire may be embedded in a foreign laser tube, but this mode is difficult to realize due to problems of process and material cost. On the other hand, the frequency stabilization algorithm will influence the frequency reproducibility of the laser device. The existing optical power balance method uses the double-longitudinal-mode optical power difference as the reference, cannot directly reflect the frequency change, and still has the problem of frequency work point drift. Therefore, the existing laser frequency stabilization technology is difficult to improve the frequency reproducibility of the laser device under the condition of high frequency stability.

SUMMARY

The disclosure provides a high-frequency-reproducibility laser frequency stabilization method and device based on multi-point acquisition of laser tube temperature, is directed to provide a novel heating temperature measuring method based on a laser device of a thermal frequency stabilization method by aiming at the problem of low frequency reproducibility of an existing laser device, and provide a laser light source with high frequency stability and high frequency reproducibility for industrial sites of a new generation of ultra-precision processing and measurement.

A high-frequency-reproducibility laser frequency stabilization device based on multi-point acquisition of laser tube temperature includes: a double-longitudinal-mode laser device power supply, a laser tube, an internal thermal conductivity glue layer, a plurality of groups of heating films, temperature sensors, an external thermal conductivity glue layer and a heat insulation layer. The temperature sensors are respectively embedded inside the plurality of groups of heating films. The heating films are pasted on an outer wall of the laser tube through the internal thermal conductivity glue layer. The external thermal conductivity glue layer and the heat insulation layer are sequentially disposed outside the plurality of groups of heating films in a tightly attached manner. Positive and negative electrodes of the double-longitudinal-mode laser device power supply are respectively connected to two ends of the laser tube. One laser transmitting hole is respectively provided in the heat insulation layer close to each of the two ends of the laser tube. The positive and negative electrodes of the double-longitudinal-mode laser device power supply are respectively connected to the two ends of the laser tube. The laser frequency stabilization device further includes a frequency stabilization control circuit. The frequency stabilization control circuit includes a polarizing beam splitter, an optical power conversion circuit, an A/D conversion circuit, a temperature measuring circuit, a microprocessor, a D/A converter and a heating film driver. The polarizing beam splitter is disposed outside any one of the laser transmitting holes. The optical power conversion circuit is disposed on reflection and refraction optical paths of the polarizing beam splitter. The optical power conversion circuit, the A/D conversion circuit, the microprocessor, the D/A converter, the heating film driver and the plurality of groups of heating films are sequentially in one-way connection. The temperature sensors, the temperature measuring circuit and the microprocessor are sequentially in one-way connection.

The double-longitudinal-mode laser device power supply is configured to provide electric power for the laser tube.

The laser tube is configured to output laser to the polarizing beam splitter.

The internal thermal conductivity glue layer and the external thermal conductivity glue layer are configured to conduct heat.

The plurality of groups of heating films are configured to receive a driving signal of the heating film driver and perform temperature control on the laser tube according to the driving signal of the heating film driver.

The temperature sensors are configured to acquire the temperature of the laser tube and transmit the temperature to the temperature measuring circuit in an electric signal form.

The external thermal conductivity glue layer is configured to outwards conduct the heat of the plurality of groups of heating films.

The heat insulation layer is configured to block the dissipation of heat inside the heat insulation layer.

The polarizing beam splitter is configured to reflect and refract laser emitted from the laser tube onto a photoelectric converter part of the optical power conversion circuit.

The optical power conversion circuit is configured to convert the laser into an optical analog signal and output the optical analog signal to the A/D conversion circuit.

The A/D conversion circuit is configured to convert the optical analog signal into an optical digital signal and output the optical digital signal to the microprocessor.

The temperature measuring circuit is configured to obtain temperature analog signals of the temperature sensors, convert the temperature analog signals into temperature digital signals, and then transmit the temperature digital signals to the microprocessor.

The microprocessor is configured to process the optical digital signal and the temperature digital signals, and output a temperature control digital signal to the D/A converter.

The D/A converter is configured to convert the temperature control digital signal into a temperature control analog signal and output the temperature control analog signal to the heating film driver.

The heating film driver is configured to output a corresponding driving signal to the plurality of groups of heating films according to the temperature control analog signal.

Further, the plurality of groups of heating films are heating films using a material with good heat uniformity as a substrate.

The plurality of groups of heating films are not less than three groups.

Further, the temperature measuring accuracy of the temperature sensors is 0.005° C.

A high-frequency-reproducibility laser frequency stabilization method based on multi-point acquisition of laser tube temperature is applied to the high-frequency-reproducibility laser frequency stabilization device based on multi-point acquisition of laser tube temperature. The frequency stabilization method includes the following steps:

step 1, switching on a double-longitudinal-mode laser device power supply, acquiring the temperature of a laser tube by using temperature sensors embedded in a plurality of groups of heating films and a temperature measuring circuit before the laser tube is preheated, recording acquired data as $T_1, \ldots, T_N$, processing the group of data, taking the characteristic temperature as $T_{tube}$, and using the characteristic temperature as the initial temperature of the laser tube in this environment state;

step 2, naturally preheating the laser tube so that optical power in the laser tube periodically changes, wherein a process from one optical power to a next identical optical power is one mode, measuring integral temperature change $\Delta T$ of the laser tube by using the temperature sensors in the plurality of groups of heating films within a period of time and the quantity $\Delta N$ of optical power change modes of the laser tube corresponding to the period of time, and calculating a temperature change coefficient $\alpha$ corresponding to the single mode of the laser tube according to $$\alpha = \frac{\Delta N}{\Delta T};$$

step 3, acquiring initial temperature values $T_0', T_1', \ldots, T_N'$ corresponding to the temperature sensors in the plurality of groups of heating films, processing initial temperature value data, taking the characteristic temperature of the initial temperature value data as $T'$, presetting the temperature of the whole laser tube into $T_{set}$ during frequency stabilization, calculating the number $N_{set}$ of modes reached when the laser tube reaches the preset temperature, and using $N_{set}$ as the number of modes that the optical power needs to be changed when the whole laser tube reaches the preset temperature;

step 4, controlling the plurality of groups of heating films to heat the laser tube by using a frequency stabilization control circuit, at this moment, enabling the laser tube to enter a preheating stage, recording the mode change quantity of the whole laser tube by using the change of two paths of optical power, when the mode change quantity reaches $N_{set}-\Delta N$, completing the preheating process, and enabling the laser tube to enter a frequency stabilization control stage; and step 5, due to nonuniformity of a glass shell of the laser tube, temperature points reached by the plurality of groups of heating films under the same driving voltage in the same time are different when the preheating process is completed, recording the different temperature points as $T_0'', T_1'', \ldots, T_N''$, using this group of temperature change data as reference, respectively controlling the plurality of groups of heating films, controlling the driving voltage of the plurality of groups of heating films by a microprocessor through an algorithm to finely adjust the integral temperature of the laser tube, so as to enable the temperature of the temperature sensors to reach $T_{set}$, and finally controlling the laser tube to reach a high-frequency-stability state.

Further, $\Delta N$ is smaller than $N_{set}$.

The disclosure has the following main advantages:

(1) The disclosure uses the heating films as actuating members for adjusting the cavity length of a resonant cavity of the laser tube. Compared with other thermal actuating members, the plurality of groups of heating films respectively heat different regions of the laser tube, so that the influence of output frequency drift of the laser tube caused by nonuniform heating is eliminated. Additionally, the temperature sensors embedded in the heating films may avoid the problem of initial temperature measuring inaccuracy of the laser tube caused by external environment temperature change or insufficient heat dissipation of the laser device, and reduce the problem of different final frequency stabilization temperature points caused by initial temperature drift of the laser tube. The method may improve the frequency reproducibility of the laser device from $10^{-8}$ to $10^{-9}$. This is a technology innovative point different from the prior art.

(2) The disclosure integrates advantages of the temperature and the optical power on the stable-frequency discrimination reference in an algorithm aspect. Through discrimination on the quantity of the optical power modes, the number of mode change inside the laser tube can be conveniently and accurately measured, and the preheating time of the laser device is reduced. By using the temperature as a reference quantity, the cavity length change of the laser tube can be directly reflected. Additionally, the plurality of groups of heating films can respectively perform timely temperature control on each region on the laser tube by using corresponding algorithms. By integrating the two measures, a condition of drift of the final frequency stabilization temperature points can be effectively avoided. This is a technology innovative point different from the prior art.

In the figures, 1 denotes double-longitudinal-mode laser device power supply; 2 denotes laser tube; 3 denotes internal thermal conductivity glue layer; 4 denotes plurality of groups of heating films; 5 denotes temperature sensor; 6 denotes external thermal conductivity glue layer; 7 denotes heat insulation layer; 8 denotes polarizing beam splitter; 9 denotes optical power conversion circuit; 10 denotes A/D conversion circuit; 11 denotes temperature measuring circuit; 12 denotes microprocessor; 13 denotes D/A converter; and 14 denotes heating film driver.

DETAILED DESCRIPTION

Clear and complete description will be made to the technical schemes of embodiments of the disclosure in conjunction with drawings in the embodiments of the disclosure hereafter. Obviously, the described embodiments are merely a part of embodiments of the disclosure and not all the embodiments. Based on the embodiments of the disclosure, all other embodiments obtained by those ordinarily skilled in the art without any creative effort are within the protection scope of the disclosure.

Figure 2:
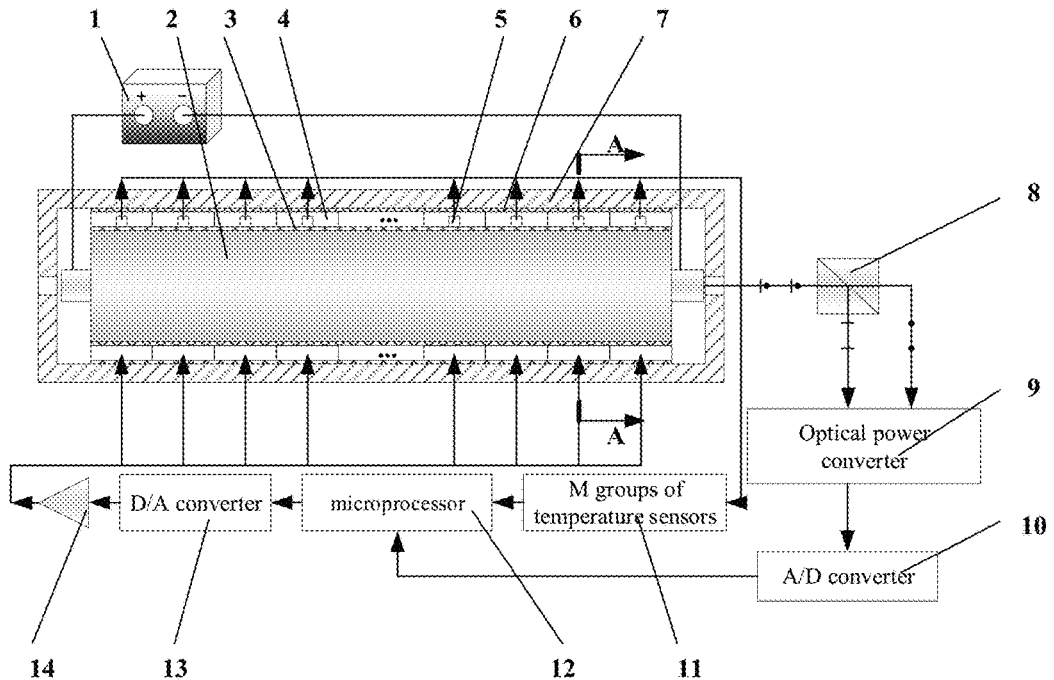
FIG. 2 is a schematic structure diagram of the high-frequency-reproducibility laser frequency stabilization device based on multi-point acquisition of laser tube temperature of the disclosure.
Figure 3:
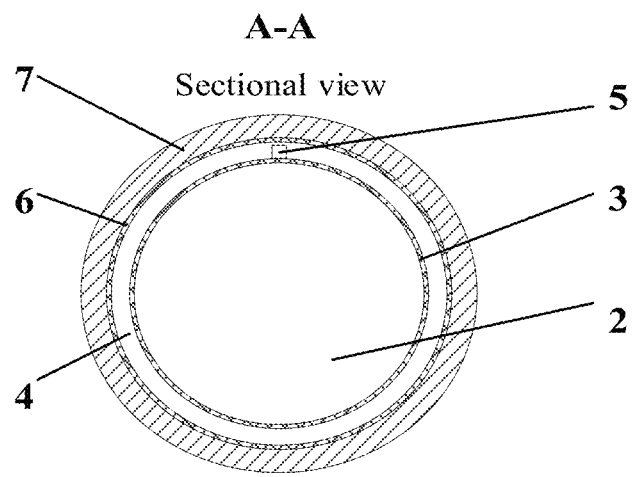
FIG. 3 is an A-A direction sectional view in FIG. 2.
Figure 7:
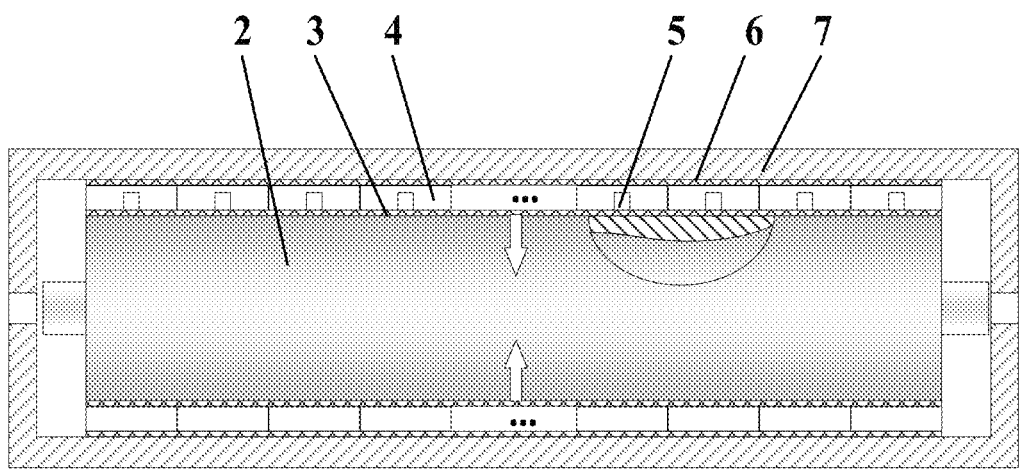
FIG. 7 is a local sectional view of a glass side wall of the laser tube.

Referring to FIG. 2, FIG. 3 and FIG. 7, a high-frequency-reproducibility laser frequency stabilization device based on multi-point acquisition of laser tube temperature includes: a double-longitudinal-mode laser device power supply 1, a laser tube 2, an internal thermal conductivity glue layer 3, a plurality of groups of heating films 4, temperature sensors 5, an external thermal conductivity glue layer 6 and a heat insulation layer 7. The temperature sensors 5 are respectively embedded inside the plurality of groups of heating films 4, and the heating films 4 are pasted onto an outer wall of the laser tube 2 through the internal thermal conductivity glue layer 3. The external thermal conductivity glue layer 6 and the heat insulation layer 7 are sequentially disposed outside the plurality of groups of heating films 4 in a tightly attached manner. Positive and negative electrodes of the double-longitudinal-mode laser device power supply 1 are respectively connected to two ends of the laser tube 2. One laser transmitting hole is respectively provided in the heat insulation layer 7 close to each of the two ends of the laser tube 2. The positive and negative electrodes of the double-longitudinal-mode laser device power supply 1 are respectively connected to the two ends of the laser tube 2. The laser frequency stabilization device further includes a frequency stabilization control circuit. The frequency stabilization control circuit includes a polarizing beam splitter 8, an optical power conversion circuit 9, an A/D conversion circuit 10, a temperature measuring circuit 11, a microprocessor 12, a D/A converter 13 and a heating film driver 14. The polarizing beam splitter 8 is disposed outside any one of the laser transmitting holes. The optical power conversion circuit 9 is disposed on reflection and refraction optical paths of the polarizing beam splitter 8. The optical power conversion circuit 9, the A/D conversion circuit 10, the microprocessor 12, the D/A converter 13, the heating film driver 14 and the plurality of groups of heating films 4 are sequentially in one-way connection. The temperature sensors 5, the temperature measuring circuit 11 and the microprocessor 12 are sequentially in one-way connection.

In exemplary embodiments of this part, the double-longitudinal-mode laser device power supply 1 is configured to provide electric power for the laser tube 2.

The laser tube 2 is configured to output laser to the polarizing beam splitter 8.

The internal thermal conductivity glue layer 3 and the external thermal conductivity glue layer 6 are configured to conduct heat.

The plurality of groups of heating films 4 are configured to receive a driving signal of the heating film driver 14 and perform temperature control on the laser tube 2 according to the driving signal of the heating film driver 14.

The temperature sensors 5 are configured to acquire the temperature of the laser tube 2 and transmit the temperature to the temperature measuring circuit 11 in an electric signal form.

The heat insulation layer 7 is configured to block the dissipation of heat inside the heat insulation layer 7.

The polarizing beam splitter 8 is configured to reflect and refract laser emitted from the laser tube 2 onto a photoelectric converter part of the optical power conversion circuit 9.

The optical power conversion circuit 9 is configured to convert the laser into an optical analog signal and output the optical analog signal to the A/D conversion circuit 10.

The A/D conversion circuit 10 is configured to convert the optical analog signal into an optical digital signal and output the optical digital signal to the microprocessor 12.

The temperature measuring circuit 11 is configured to obtain temperature analog signals of the temperature sensors 5, convert the temperature analog signals into temperature digital signals, and then transmit the temperature digital signals to the microprocessor 12.

The microprocessor 12 is configured to process the optical digital signal and the temperature digital signals, and output a temperature control digital signal to the D/A converter 13.

The D/A converter 13 is configured to convert the temperature control digital signal into a temperature control analog signal and output the temperature control analog signal to the heating film driver 14.

The heating film driver 14 is configured to output a corresponding driving signal to the plurality of groups of heating films 4 according to the temperature control analog signal.

In exemplary embodiments of this part, the plurality of groups of heating films 4 are heating films using a material with good heat uniformity as a substrate.

In exemplary embodiments of this part, the plurality of groups of heating films 4 are not less than three groups.

In exemplary embodiments of this part, the temperature measuring accuracy of the temperature sensors 5 is 0.005° C.

Figure 1:
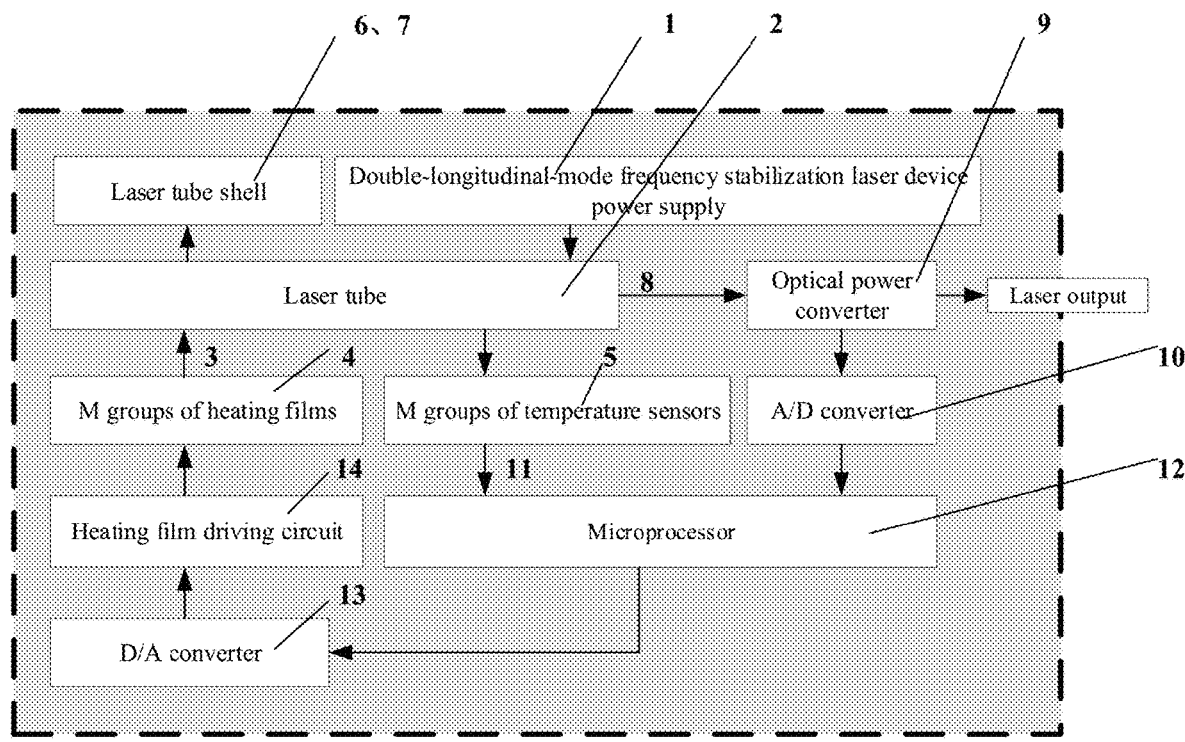
FIG. 1 is a schematic principle diagram of a high-frequency-reproducibility laser frequency stabilization device based on multi-point acquisition of laser tube temperature of the disclosure.

Referring to FIG. 1, a high-frequency-reproducibility laser frequency stabilization method based on multi-point acquisition of laser tube temperature is applied to the high-frequency-reproducibility laser frequency stabilization device based on multi-point acquisition of laser tube temperature. The frequency stabilization method includes the following steps:

Step 1, a double-longitudinal-mode laser device power supply 1 is switched on. The temperature of a laser tube 2 is acquired by using temperature sensors 5 embedded in a plurality of groups of heating films 4 and a temperature measuring circuit 11 before the laser tube 2 is preheated. Acquired data is recorded as $T_1, \ldots, T_N$. The group of data is processed. The characteristic temperature is taken as $T_{tube}$. The characteristic temperature is used as the initial temperature of the laser tube 2 in this environment state.

Step 2, the laser tube 2 is naturally preheated so that optical power in the laser tube 2 periodically changes. A process from one optical power to a next identical optical power is one mode. Integral temperature change $\Delta T$ of the laser tube 2 is measured by using the temperature sensors 5 in the plurality of groups of heating films 4 within a period of time and the quantity $\Delta N$ of optical power change modes of the laser tube 2 corresponding to the period of time. A temperature change coefficient $\alpha$ corresponding to the single mode of the laser tube 2 is calculated according to $$\alpha = \frac{\Delta N}{\Delta T}.$$

Step 3, initial temperature values $T_0'$, $T_1'$, ..., $T_N'$ corresponding to the temperature sensors 5 in the plurality of groups of heating films 4 are acquired. Initial temperature value data is processed. The characteristic temperature of the initial temperature value data is taken as T'. The temperature of the whole laser tube 2 is preset into $T_{set}$ during frequency stabilization. The number $N_{set}$ of modes reached when the laser tube 2 reaches the preset temperature is calculated. $N_{set}$ is used as the number of modes that the optical power needs to be changed when the whole laser tube 2 reaches the preset temperature.

Step 4, the plurality of groups of heating films 4 are controlled to heat the laser tube 2 by using a frequency stabilization control circuit. At this moment, the laser tube 2 enters a preheating stage. The mode change quantity of the whole laser tube 2 is recorded by using the change of two paths of optical power. When the mode change quantity reaches $N_{set}-\Delta N$, the preheating process is completed. The laser tube 2 enters a frequency stabilization control stage.

Step 5, due to nonuniformity of a glass shell of the laser tube 2, temperature points reached by the plurality of groups of heating films 4 under the same driving voltage in the same time are different when the preheating process is completed, and the different temperature points are recorded as $T_0''$, $T_1''$, ..., $T_N''$. This group of temperature change data is used as reference to respectively control the plurality of groups of heating films 4. The driving voltage of the plurality of groups of heating films 4 is controlled by a microprocessor 12 through an algorithm to finely adjust the integral temperature of the laser tube 2, so as to enable the temperature of the temperature sensors 5 to reach $T_{set}$. The laser tube 2 is finally controlled to reach a high-frequency-stability state.

In exemplary embodiments of this part, $\Delta N$ is smaller than $N_{set}$.

Figure 5:
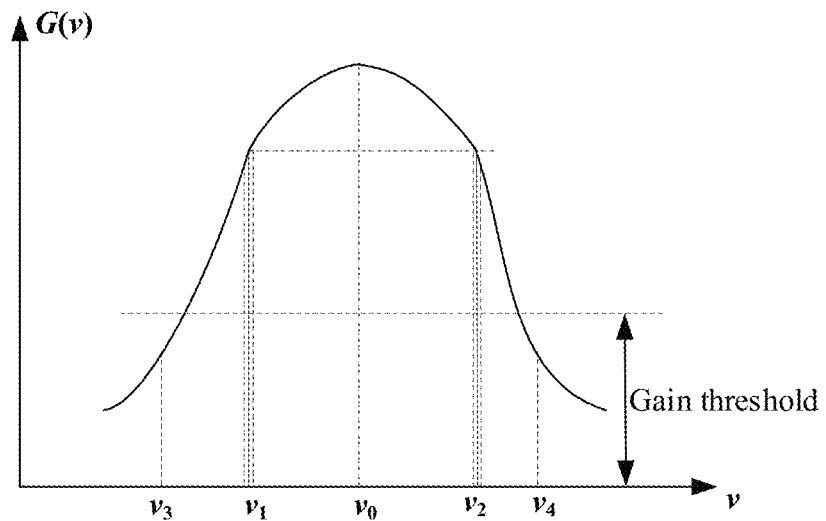
FIG. 5 is a relationship diagram between a gain threshold and a mode in the laser tube.
Figure 6:
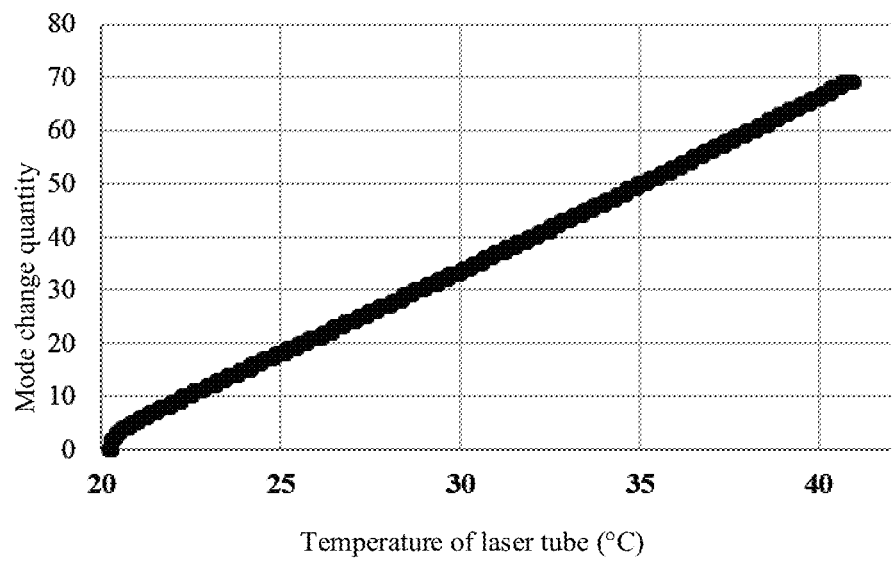
FIG. 6 is a relationship curve diagram between temperature and optical power mode change of the laser tube.

A specific embodiment is given hereafter:

When a device example starts to work, a double-longitudinal laser power supply is switched on. The temperature of a laser tube 2 is acquired by M groups of temperature sensors 5 embedded in heating films and a temperature measuring circuit 11 before the laser tube is preheated. Acquired data is recorded as $T_1, \ldots, T_N$. The group of data is processed. The characteristic temperature is taken as $T_{tube}$. This temperature is used as the initial temperature of the laser tube in this environment state. Integral temperature change $\Delta T$ of the laser tube is measured by using the temperature sensors 5 of the heating films 4, and the quantity $\Delta N$ of optical power change modes of the laser device 2 corresponding to the temperature change is measured. FIG. 5 is an actual experiment image of the mode change quantity of the laser tube 2 and the temperature of the laser tube 2.

From the image, it can be known that a linear relationship exists between the mode change quantity and the temperature of the laser tube 2. A temperature change coefficient $\alpha$ may be expressed as:

$$\alpha = \frac{\Delta N}{\Delta T}.$$

When the above process is completed, temperature values $T_0'$, $T_1'$, ..., $T_N'$ of the laser tube 2 at this time are acquired again by M temperature sensors 5. The temperature of the whole laser tube 2 during frequency stabilization is preset into $T_{set}$. For each temperature value, the number $\Delta N_i$ of modes that the optical power needs to be changed when the laser tube 2 reaches the preset temperature is calculated, and is expressed as:

$$\Delta N_i = T_i \cdot \alpha.$$

Figure 4:
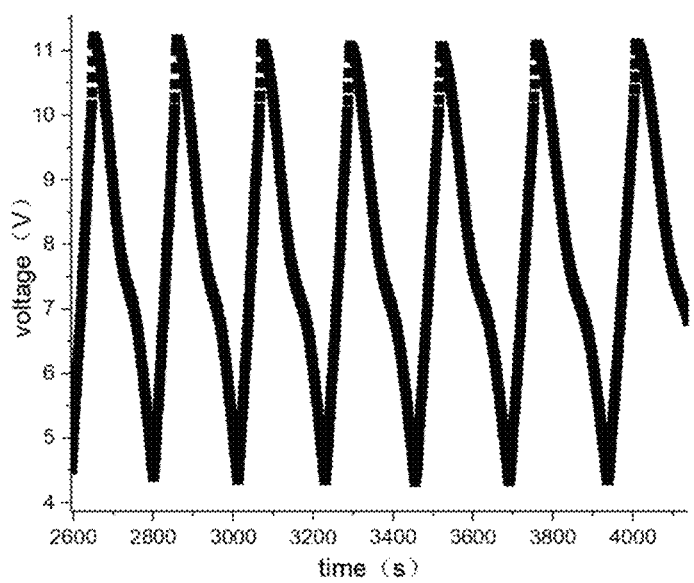
FIG. 4 is an optical power mode change diagram in a laser tube.

This group of data is processed to obtain the characteristic mode number $N_{set}$. FIG. 4 is a mode change diagram of actual optical power electric signals in the laser tube 2. A process from one maximum value of the optical power to a next maximum value is one mode. The $N_{set}$ is used as the number of modes that the optical power needs to be changed when the whole laser tube reaches the preset temperature. After the process is completed, a heat driving circuit 14 drives heating films 4 at proper driving voltage. The laser tube 2 enters a preheating stage. An optical power conversion circuit 9 converts double-frequency optical power into a voltage signal. Signal conversion is performed by an A/D conversion circuit. The mode optical power mode change is recognized by a microprocessor 12. When the mode change quantity reaches $N_{set}-2$, the preheating process is completed. The laser tube 2 enters a frequency stabilization control stage.

Figure 9:
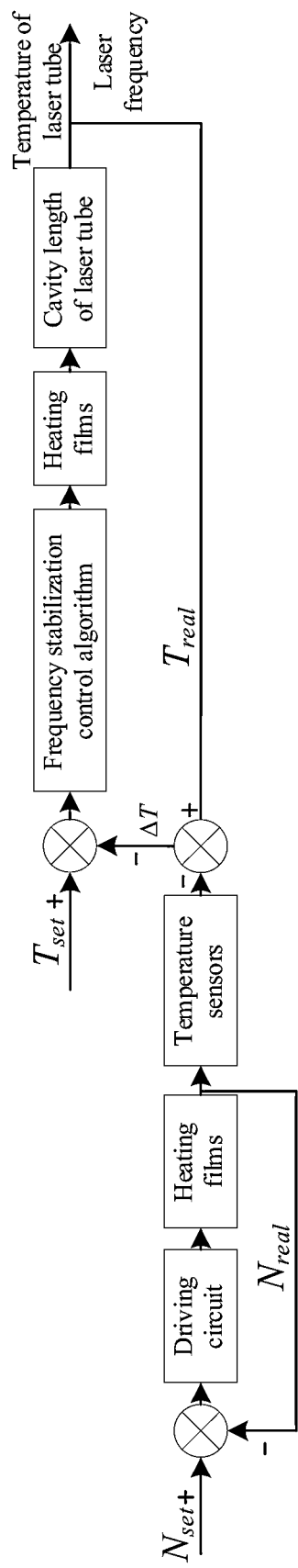
FIG. 9 is a schematic diagram of a closed-loop control system in the frequency stabilization process.

According to a local sectional view of a side wall of the laser tube 2 as shown in FIG. 7, heat transfer of the heating films 4 to the laser tube 2 is inward in an axial direction. The glass shell of the laser tube 2 actually has nonuniformity. Therefore, when the preheating process is completed, under the same driving voltage, temperature points reached by the M groups of heating films 4 in the same time are different. Therefore, at this moment, the laser tube 2 needs to be subjected to multi-point temperature measurement and control so as to eliminate anisotropy of temperature fields on the laser tube 2. FIG. 9 is a schematic diagram of a closed-loop control system in the frequency stabilization process of the double-longitudinal-mode frequency stabilization laser device in the device of the disclosure. According to a control strategy, temperature is used as the reference quantity, and a corresponding algorithm is performed to apply certain driving voltage to the heating films 4. The temperature of the laser tube is controlled to achieve the objective of controlling a cavity length of the laser tube 2. When the temperature of the laser tube 2 reaches the preheating temperature target $T_{set}$, at this moment, the mode change quantity of the laser tube 2 reaches $N_{set}$, and the double-longitudinal-mode laser tube reaches a high-frequency-stability state. The microprocessor enables a state indicating lamp 2. At this moment, a frequency stabilization work process is completed. The frequency of the double-longitudinal-mode laser device is stable and available. (Repeat)

Figure 8:
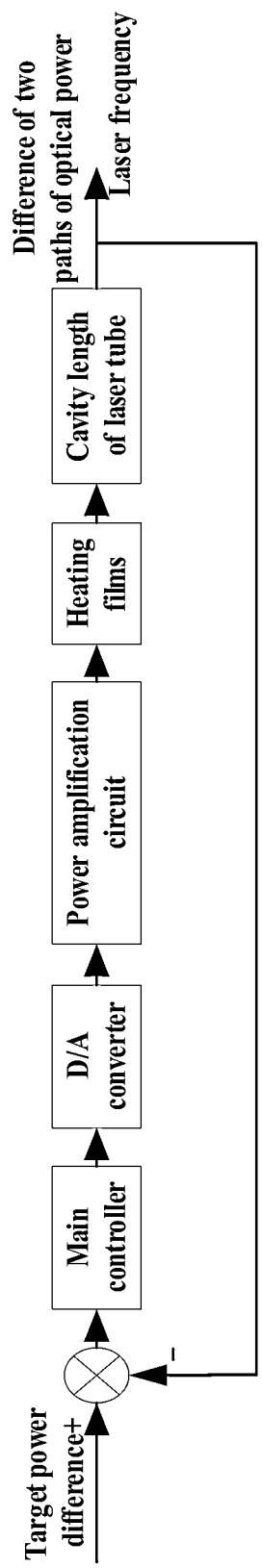
FIG. 8 is a schematic diagram of a control system in a frequency stabilization process.

FIG. 5 is a relationship diagram between a gain threshold and a mode in the laser tube 2. For a double-frequency laser device, two and only two spectral lines of the whole optical frequency gain are effective. FIG. 8 is a schematic diagram of a control system in a frequency stabilization process of a power balance type double-longitudinal-mode frequency stabilization laser device of an ordinary double-frequency laser device. At this moment, the frequency stabilization control of the laser device uses the optical power as the frequency stabilization reference, but the optical power cannot directly reflect the cavity length relationship of the laser tube 2. Additionally, temperature work points during frequency stabilization after the power balance type laser device is electrified for multiple times are easy to drift. At this moment, corresponding frequencies $v_1$ and $v_2$ of the laser device may drift. FIG. 8 is a schematic diagram of the control system in the frequency stabilization process of the disclosure. The double-frequency laser device in the disclosure uses the temperature as the reference quantity, and can directly reflect the cavity length of the laser tube 2. The problem of temperature work point drift of the laser tube 2 during frequency stabilization is avoided.

Figure 10:
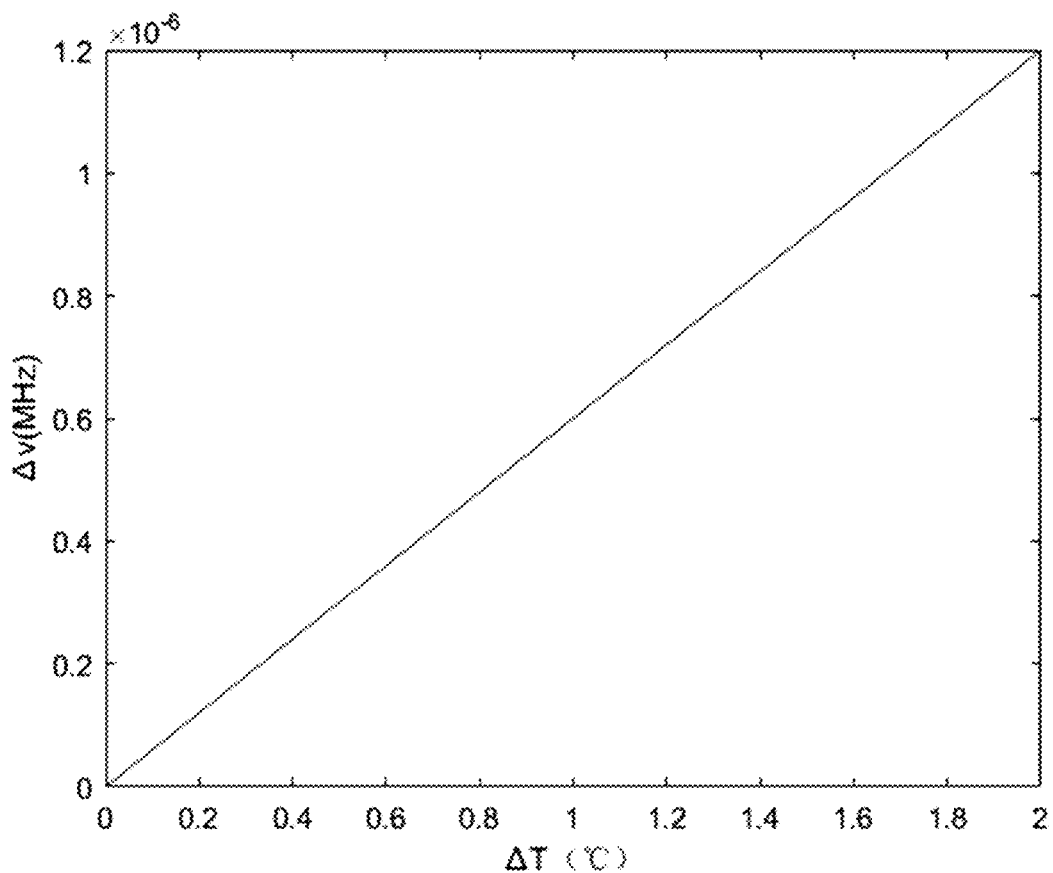
FIG. 10 is a relationship diagram between temperature change and frequency drift of the laser tube.

FIG. 10 is a relationship between temperature change and frequency drift of the laser tube 2. The laser tube 2 uses quartz glass as a material. A linear expansion coefficient α of a resonant cavity partition material meets $\alpha = 6 \times 10^{-7}/°C.$, so that the relationship between the frequency drift quantity and the temperature meets a formula:

$$\alpha \Delta T = \frac{\Delta v}{v} = \frac{\Delta L}{L}.$$

The temperature measuring accuracy of the temperature sensors 5 of the laser device used in an actual device of the disclosure is 0.005° C. Therefore, if a relative temperature difference between a final frequency stabilization temperature work point of the laser device and the preset temperature $T_{set}$ is controlled within 0.01° C., the final maximum frequency relative drift quantity is $6 \times 10^{-9}$, and the final requirement of the disclosure on the high frequency reproducibility of the integral laser device is met.

What is claimed is:

1. A high-frequency-reproducibility laser frequency stabilization device based on multi-point acquisition of laser tube temperature, comprising a double-longitudinal-mode laser device power supply (1), a laser tube (2), an internal thermal conductivity glue layer (3), a plurality of groups of heating films (4), temperature sensors (5), an external thermal conductivity glue layer (6) and a heat insulation layer (7), wherein the temperature sensors (5) are respectively embedded inside the plurality of groups of heating films (4); the heating films (4) are pasted onto an outer wall of the laser tube (2) through the internal thermal conductivity glue layer (3); the external thermal conductivity glue layer (6) and the heat insulation layer (7) are sequentially disposed outside the plurality of groups of heating films (4); positive and negative electrodes of the double-longitudinal-mode laser device power supply (1) are respectively connected to two ends of the laser tube (2); one laser transmitting hole is respectively provided in the heat insulation layer (7) close to each of the two ends of the laser tube (2); the positive and negative electrodes of the double-longitudinal-mode laser device power supply (1) are respectively connected to the two ends of the laser tube (2); the laser frequency stabilization device further comprises a frequency stabilization control circuit; the frequency stabilization control circuit comprises a polarizing beam splitter (8), an optical power conversion circuit (9), an A/D conversion circuit (10), a temperature measuring circuit (11), a microprocessor (12), a D/A converter (13) and a heating film driver (14); the polarizing beam splitter (8) is disposed outside any one of the laser transmitting holes; the optical power conversion circuit (9) is disposed on reflection and refraction optical paths of the polarizing beam splitter (8); the optical power conversion circuit (9), the A/D conversion circuit (10), the microprocessor (12), the D/A converter (13), the heating film driver (14) and the plurality of groups of heating films (4) are sequentially in one-way connection; and the temperature sensors (5), the temperature measuring circuit (11) and the microprocessor (12) are sequentially in one-way connection;

the double-longitudinal-mode laser device power supply (1) is configured to provide electric power for the laser tube (2);

the laser tube (2) is configured to output laser to the polarizing beam splitter (8);

the internal thermal conductivity glue layer (3) and the external thermal conductivity glue layer (6) are configured to conduct heat;

the plurality of groups of heating films (4) are configured to receive a driving signal of the heating film driver (14) and perform temperature control on the laser tube (2) according to the driving signal of the heating film driver (14);

the temperature sensors (5) are configured to acquire temperature of the laser tube (2) and transmit the temperature to the temperature measuring circuit (11) in an electric signal form;

the external thermal conductivity glue layer (6) is configured to outwardly conduct the heat of the plurality of groups of heating films (4);

the heat insulation layer (7) is configured to block dissipation of heat inside the heat insulation layer (7);

the polarizing beam splitter (8) is configured to reflect and refract laser emitted from the laser tube (2) onto a photoelectric converter part of the optical power conversion circuit (9);

the optical power conversion circuit (9) is configured to convert the laser into an optical analog signal and output the optical analog signal to the A/D conversion circuit (10);

the A/D conversion circuit (10) is configured to convert the optical analog signal into an optical digital signal and output the optical digital signal to the microprocessor (12);

the temperature measuring circuit (11) is configured to obtain temperature analog signals of the temperature sensors (5), convert the temperature analog signals into temperature digital signals, and then transmit the temperature digital signals to the microprocessor (12);

the microprocessor (12) is configured to process the optical digital signal and the temperature digital signals, and output a temperature control digital signal to the D/A converter (13);

the D/A converter (13) is configured to convert the temperature control digital signal into a temperature control analog signal and output the temperature control analog signal to the heating film driver (14); and the heating film driver (14) is configured to output a corresponding driving signal to the plurality of groups of heating films (4) according to the temperature control analog signal.

2. The high-frequency-reproducibility laser frequency stabilization device based on multi-point acquisition of laser tube temperature according to claim 1, wherein the plurality of groups of heating films (4) are not less than three groups.

3. The high-frequency-reproducibility laser frequency stabilization device based on multi-point acquisition of laser tube temperature according to claim 1, wherein temperature measuring accuracy of the temperature sensors (5) is 0.005° C.

4. A high-frequency-reproducibility laser frequency stabilization method based on multi-point acquisition of laser tube temperature, applied to the high-frequency-reproducibility laser frequency stabilization device based on multi-point acquisition of laser tube temperature according to claim 1, wherein the frequency stabilization method comprises the following steps:

step 1, switching on the double-longitudinal-mode laser device power supply (1), acquiring temperature of the laser tube (2) by using the temperature sensors (5) embedded in the plurality of groups of heating films (4) and the temperature measuring circuit (11) before the laser tube (2) is preheated, recording acquired data as $T_1, \ldots, T_N$, processing the data, taking characteristic temperature as $T_{tube}$, and using the characteristic temperature as initial temperature of the laser tube (2) in this environment state;

step 2, preheating the laser tube (2) so that optical power in the laser tube (2) periodically changes, wherein a process from one optical power to a next identical optical power is one mode, measuring integral temperature change $\Delta T$ of the laser tube (2) by using the temperature sensors (5) in the plurality of groups of heating films (4) within a period of time and a quantity $\Delta N$ of optical power change modes of the laser tube (2) corresponding to the period of time, and calculating a temperature change coefficient α corresponding to the single mode of the laser tube (2) according to $$\alpha = \frac{\Delta N}{\Delta T};$$

step 3, acquiring initial temperature values $T_0', T_1', \ldots, T_N'$ corresponding to the temperature sensors (5) in the plurality of groups of heating films (4), processing initial temperature value data, taking characteristic temperature of the initial temperature value data as T', presetting the temperature of the whole laser tube (2) into $T_{set}$ during frequency stabilization, calculating the number $N_{set}$ of modes reached when the laser tube (2) reaches the preset temperature, and using $N_{set}$ as the number of modes that the optical power needs to be changed when the whole laser tube (2) reaches the preset temperature;

step 4, controlling the plurality of groups of heating films (4) to heat the laser tube (2) by using a frequency stabilization control circuit, enabling the laser tube (2) to enter a preheating stage, recording a mode change quantity of the whole laser tube (2) by using the change of two paths of optical power, when the mode change quantity reaches $N_{set}-\Delta N$, completing the preheating process, and enabling the laser tube (2) to enter a frequency stabilization control stage; and step 5, wherein temperature points reached by the plurality of groups of heating films (4) under the same driving voltage in the same time are different when the preheating process is completed, recording the different temperature points as $T_0'', T_1'', \ldots, T_N''$, using the temperature change data as reference, separately controlling the plurality of groups of heating films (4), controlling driving voltages of the plurality of groups of heating films (4) by a microprocessor (12) through an algorithm to adjust the integral temperature of the laser tube (2), so as to enable the temperature of the temperature sensors (5) to reach $T_{set}$, and finally controlling the laser tube (2) to reach a high-frequency-stability state.

5. The high-frequency-reproducibility laser frequency stabilization method based on multi-point acquisition of laser tube temperature according to claim 4, wherein $\Delta N$ is smaller than $N_{set}$.

\* \* \* \* \*